US012566591B2

(12) United States Patent
Malapati et al.

(10) Patent No.: US 12,566,591 B2
(45) Date of Patent: Mar. 3, 2026

(54) VISUAL DATA MERGE PIPELINES

(71) Applicant: Capital One Services, LLC, McLean, VA (US)

(72) Inventors: Manohar Malapati, Plano, TX (US); Ramakrishna Chowdary Somepalli, Plano, TX (US); Manav Jain, Broadlands, VA (US)

(73) Assignee: Capital One Services, LLC, McLean, VA (US)

(*) Notice: Subject to any disclaimer, the term of this patent is extended or adjusted under 35 U.S.C. 154(b) by 236 days.

(21) Appl. No.: 18/240,858

(22) Filed: Aug. 31, 2023

(65) Prior Publication Data

US 2025/0077194 A1      Mar. 6, 2025

(51) Int. Cl.
| | |
|---|---|
| *G06F 16/00* | (2019.01) |
| *G06F 3/04817* | (2022.01) |
| *G06F 3/0482* | (2013.01) |
| *G06F 3/04842* | (2022.01) |
| *G06F 3/04845* | (2022.01) |
| *G06F 3/0486* | (2013.01) |
| *G06F 8/34* | (2018.01) |
| *G06F 9/44* | (2018.01) |
| *G06F 9/451* | (2018.01) |
| *G06F 16/242* | (2019.01) |

(Continued)

(52) U.S. Cl.
CPC ............ *G06F 8/34* (2013.01); *G06F 3/04817* (2013.01); *G06F 3/0482* (2013.01); *G06F 3/04842* (2013.01); *G06F 3/04845* (2013.01); *G06F 3/0486* (2013.01); *G06F 9/451* (2018.02)

(58) Field of Classification Search
CPC ........ G06F 8/34; G06F 9/451; G06F 3/04817; G06F 3/0482; G06F 3/04842; G06F 3/04845; G06F 3/0486; G06F 8/71; G06F 17/18; G06F 8/70; G06N 5/04; G06N 20/20; G06N 20/00; G06N 3/08; G06N 3/04
See application file for complete search history.

(56) References Cited

U.S. PATENT DOCUMENTS

| | | | |
|---|---|---|---|
| 7,263,551 | B2 | 8/2007 | Belfiore et al. |
| 10,901,583 | B2 | 1/2021 | Meiklejohn et al. |

(Continued)

OTHER PUBLICATIONS

Bleiholder et al., "Data Fusion," ACM Computing Surveys, vol. 41, No. 1 (Dec. 2008), pp. 1-41.

*Primary Examiner* — Thuy Dao
(74) *Attorney, Agent, or Firm* — Harrity & Harrity, LLP

(57) ABSTRACT

In some implementations, a data merger may receive a configuration associated with a first data source. The data merger may receive a configuration associated with a second data source. The data merger may receive a configuration associated with a first output endpoint. The data merger may receive an indication of a first transformation to apply to first data received from the first data source and second data received from the second source, such that the first output endpoint transmits a combination of the first data and the second data after application of the first transformation. The data merger may provide the first data, received from the first data source, to a machine learning model and receive an indication of a second transformation recommended by the machine learning model. The data merger may transmit the indication of the second transformation.

20 Claims, 17 Drawing Sheets

100 ➘

(51) Int. Cl.
  *G06F 16/84*    (2019.01)
  *G06N 5/04*    (2023.01)
  *G06N 20/00*    (2019.01)

(56)        References Cited

U.S. PATENT DOCUMENTS

|  |  |  |  |  |
|---|---|---|---|---|
| 11,151,473 | B1 * | 10/2021 | Upadhyay | G06F 11/3419 |
| 11,847,130 | B2 * | 12/2023 | Kaspa | G06N 20/00 |
| 12,093,753 | B2 * | 9/2024 | Walters | G06F 11/3684 |
| 2019/0278775 | A1 * | 9/2019 | Saperstein | G06F 16/24575 |
| 2021/0173828 | A1 * | 6/2021 | McPherson | G06F 21/6218 |
| 2021/0232592 | A1 * | 7/2021 | Liao | G06N 20/00 |

* cited by examiner

100

115
Indicate drag-and-drop
associated with data source

Data merger

120
Instructions for pop-up
window

User
device

100

Data source

135
Data based on the
configuration

130
Request based on
the configuration

Data merger

125
Indicate configuration
associated with data source

User
device

100

Data merger

140
Indicate drag-and-drop
associated with output endpoint

145
Instructions for pop-up
window

User
device

175
Monitor metric

Data merger

180
Alert based on the metric
satisfying a threshold

User
device

100

100

185
Apply machine learning model to metadata

Data merger

190b
Apply the recommended transformation to the data

190a
Indicate recommended transformation

User device

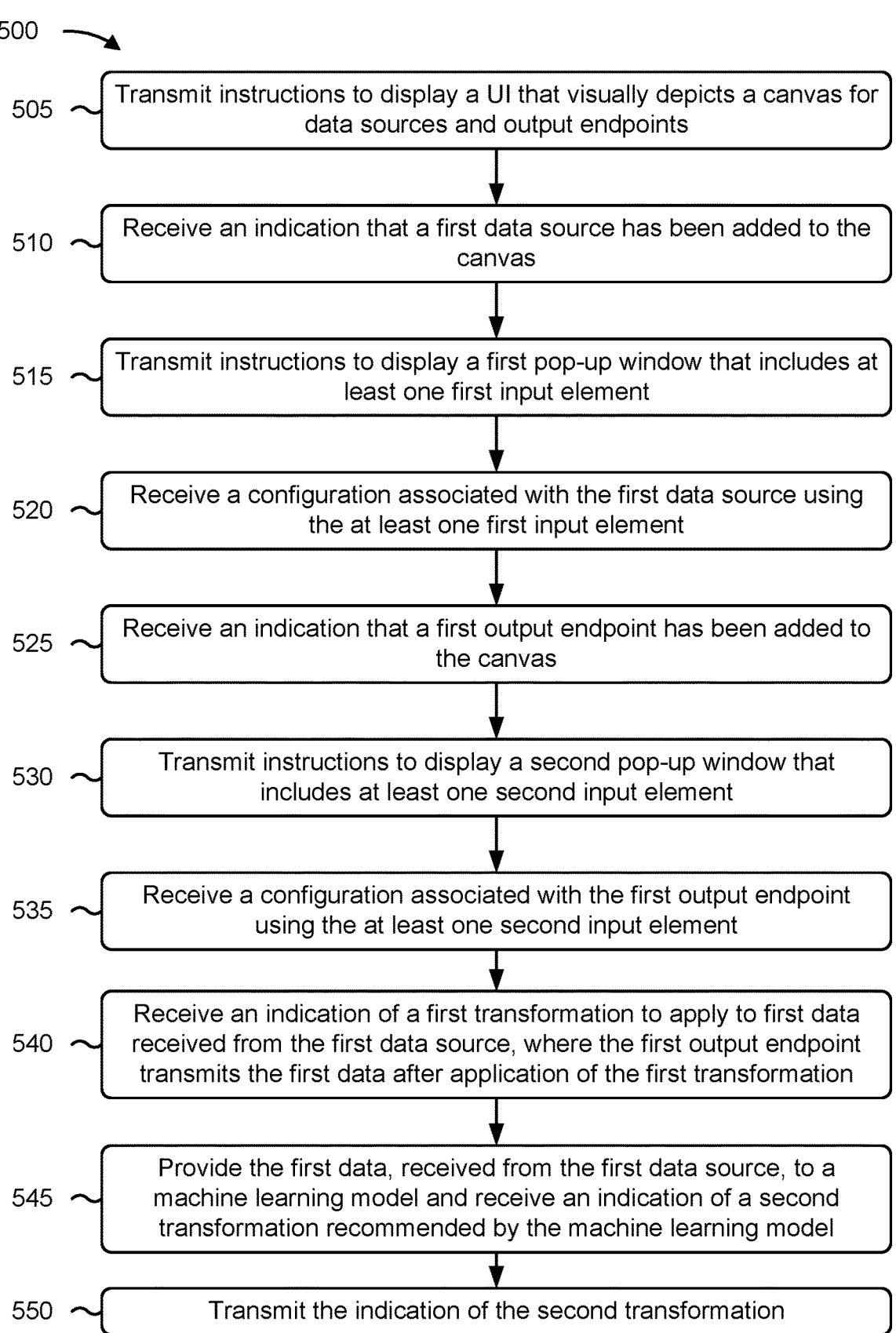

500

505 — Transmit instructions to display a UI that visually depicts a canvas for data sources and output endpoints 510 — Receive an indication that a first data source has been added to the canvas 515 — Transmit instructions to display a first pop-up window that includes at least one first input element 520 — Receive a configuration associated with the first data source using the at least one first input element 525 — Receive an indication that a first output endpoint has been added to the canvas 530 — Transmit instructions to display a second pop-up window that includes at least one second input element 535 — Receive a configuration associated with the first output endpoint using the at least one second input element 540 — Receive an indication of a first transformation to apply to first data received from the first data source, where the first output endpoint transmits the first data after application of the first transformation 545 — Provide the first data, received from the first data source, to a machine learning model and receive an indication of a second transformation recommended by the machine learning model 550 — Transmit the indication of the second transformation

FIG. 5

VISUAL DATA MERGE PIPELINES

BACKGROUND

Structured data may originate from multiple sources within an organization. For example, one application may generate one table, and another application may generate another table. Similarly, unstructured data may originate from multiple sources. For example, one application may generate one text file, and another application may generate another text file. Combining data from multiple sources may provide additional data insights or possible analytics.

SUMMARY

Some implementations described herein relate to a system for visually building data merge pipelines. The system may include one or more memories and one or more processors communicatively coupled to the one or more memories. The one or more processors may be configured to transmit instructions to display a user interface that visually depicts a canvas for data sources and output endpoints. The one or more processors may be configured to receive an indication that a first data source has been added to the canvas. The one or more processors may be configured to transmit instructions to display a first pop-up window that includes at least one first input element. The one or more processors may be configured to receive a configuration, associated with the first data source, using the at least one first input element. The one or more processors may be configured to receive an indication that a first output endpoint has been added to the canvas. The one or more processors may be configured to transmit instructions to display a second pop-up window that includes at least one second input element. The one or more processors may be configured to receive a configuration associated with the first output endpoint using the at least one second input element. The one or more processors may be configured to receive an indication of a first transformation to apply to first data received from the first data source, wherein the first output endpoint transmits the first data after application of the first transformation. The one or more processors may be configured to provide the first data, received from the first data source, to a machine learning model and receive an indication of a second transformation recommended by the machine learning model. The one or more processors may be configured to transmit the indication of the second transformation.

Some implementations described herein relate to a method of using machine learning for common schemas. The method may include receiving a configuration associated with a first data source. The method may include receiving a configuration associated with a second data source. The method may include receiving a configuration associated with a first output endpoint. The method may include receiving an indication of a first transformation to apply to first data received from the first data source and second data received from the second source, wherein the first output endpoint transmits a combination of the first data and the second data after application of the first transformation. The method may include providing metadata, associated with the first data and the second data, to a machine learning model and receiving an indication of a second transformation recommended by the machine learning model. The method may include transmitting the indication of the second transformation.

Some implementations described herein relate to a non-transitory computer-readable medium that stores a set of instructions for visually building data merge pipelines. The set of instructions, when executed by one or more processors of a device, may cause the device to transmit instructions for a user interface that visually depicts a canvas for data sources and output endpoints. The set of instructions, when executed by one or more processors of the device, may cause the device to receive an indication that a first data source has been added to the canvas. The set of instructions, when executed by one or more processors of the device, may cause the device to transmit instructions for a first pop-up window that includes at least one first input element. The set of instructions, when executed by one or more processors of the device, may cause the device to receive a configuration associated with the first data source using the at least one first input element. The set of instructions, when executed by one or more processors of the device, may cause the device to connect to the first data source based on the configuration associated with the first data source. The set of instructions, when executed by one or more processors of the device, may cause the device to receive an indication that a first output endpoint has been added to the canvas. The set of instructions, when executed by one or more processors of the device, may cause the device to transmit instructions for a second pop-up window that includes at least one second input element. The set of instructions, when executed by one or more processors of the device, may cause the device to receive a configuration, associated with the first output endpoint, using the at least one second input element. The set of instructions, when executed by one or more processors of the device, may cause the device to receive an indication of a first transformation to apply to first data received from the first data source. The set of instructions, when executed by one or more processors of the device, may cause the device to transmit transformed data, based on applying the first transformation to the first data, via the first output endpoint based on the configuration associated with the first output endpoint.

BRIEF DESCRIPTION OF THE DRAWINGS

FIG. 5 is a flowchart of an example process relating to visual data merge pipelines, in accordance with some embodiments of the present disclosure.

DETAILED DESCRIPTION

Figure 1A:
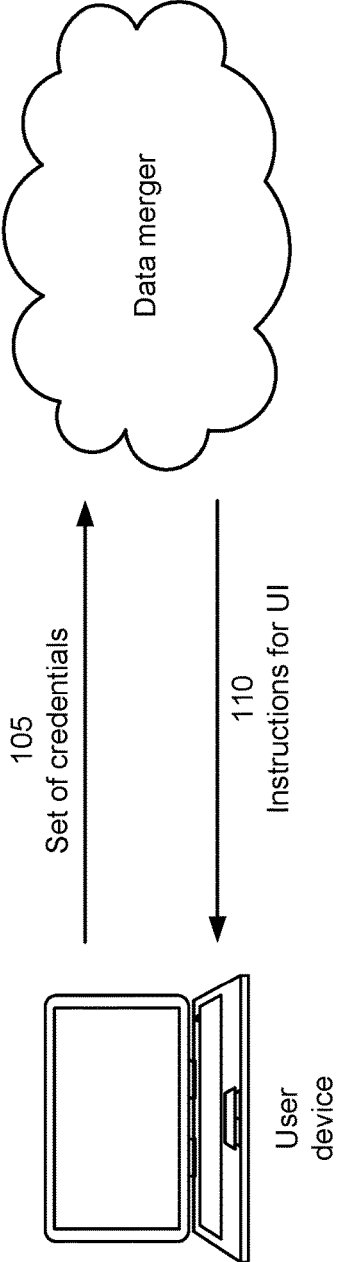
FIGS. 1A-1G are diagrams of an example implementation relating to visual data merge pipelines, in accordance with some embodiments of the present disclosure.

The following detailed description of example implementations refers to the accompanying drawings. The same reference numbers in different drawings may identify the same or similar elements.

Structured data may originate from multiple sources within an organization. As used herein, "structured data" refers to data associated with a structure (e.g., a tabular structure with rows and columns, a graphical structure with nodes and edges, or delimiter-separated values, among other examples) as opposed to unstructured data (e.g., text data without delimiters or other structure). Combining structured data from multiple sources may provide additional data insights (e.g., users appearing in multiple data sets may be collated in order to combine properties associated with a same user from different data sources) or possible analytics (e.g., by mapping actions of one user from one data source to actions associated with the same user from another data source). Similarly, combining unstructured data from multiple sources may provide additional insights or analytics.

However, combining data from multiple data sources costs power and processing resources. In particular, designing and deploying a microservice to collect data from each data source consumes power and processing resources. Additionally, designing and deploying a microservice to combine and output data from multiple data sources consumes additional power and processing resources. Furthermore, because a transformation, used to combine data from multiple data sources, is hard-coded into the microservice, accuracy and usefulness of the combined data is reduced when the transformation is sub-optimal. As a result, additional power and processing resources may be wasted on cleaning the combined data before using the combined data.

Some implementations described herein enable visual construction of data merging pipelines. For example, a user may drag shapes onto user interfaces (UIs) to construct a data pipeline that transforms data from multiple data sources and maintains an output endpoint for providing the transformed data. An existing system (e.g., a cloud-based system) may connect to the data sources and provision the output endpoint (e.g., using representational state transfer (REST) application programming interfaces (APIs)). As a result, power and processing resources are conserved that otherwise would have been consumed in constructing new microservices to ingest the data and output the transformed data. Some implementations described herein additionally or alternatively enable applying machine learning models to generate recommended transformations for data from multiple data sources. As a result, the machine learning models may increase accuracy and usefulness of transformed data with the recommended transformations, which conserves power and processing resources that would otherwise have been wasted on cleaning the transformed data.

FIGS. 1A-1G are diagrams of an example 100 associated with visual data merge pipelines. As shown in FIGS. 1A-1G, example 100 includes a data merger, a user device, a data source, and an output endpoint. These devices are described in more detail in connection with FIGS. 3 and 4.

As shown in FIG. 1A and by reference number 105, the user device may transmit, and the data merger may receive, a set of credentials (e.g., associated with a user of the user device). The set of credentials may include a username and password (or passcode), an email address and password (or passcode), a certificate or a token (e.g., provided to the user device by the data merger), and/or biometric information associated with the user, among other examples.

In some implementations, the user may provide input (e.g., using an input component, such as a mouse, a keyboard, a touchscreen, and/or a microphone, among other examples) that triggers the user device to transmit the set of credentials. For example, the user may access a website (e.g., using a web browser executed by the user device) owned by, or at least associated with, the data merger, and the user may provide the input using elements (e.g., text boxes and/or buttons, among other examples) of the website. Alternatively, the user device may transmit the set of credentials automatically (e.g., according to a schedule and/or included in a keep alive message) or in response to a request from the data merger.

Accordingly, the data merger may validate the set of credentials. For example, the data merger may verify that the set of credentials is associated with an account that is authorized to access the data merger. As shown by reference number 110, the data merger may transmit, and the user device may receive, instructions for a UI (e.g., to display a UI) that visually depicts a canvas for data sources and output endpoints. For example, the UI may be as described in connection with FIG. 2A. The user device may output the UI (e.g., using an output component, such as a display and/or a speaker, among other examples) to the user for interaction.

Figure 1B:
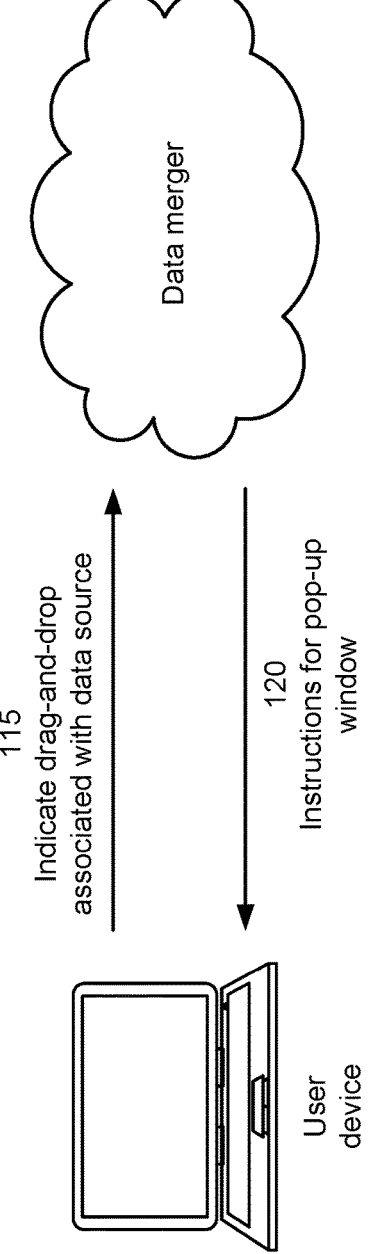

The user device may transmit, and the data merger may receive, an indication that a first data source has been added to the canvas. For example, as shown in FIG. 1B and by reference number 115, the user device may transmit an indication of a drag-and-drop associated with the first data source. As described in connection with FIG. 2B, the user (e.g., using an input component) may drag a first shape (associated with data sources) onto the canvas, which may cause the user device to transmit the indication associated with the first data source.

In response to the indication, the data merger may transmit, and the user device may receive, instructions for a first pop-up window (e.g., to display a first pop-up window) associated with the first data source that includes a first input element (e.g., at least one first input element), as shown by reference number 120. The user device may output the first pop-up window (e.g., using an output component) to the user for interaction. As described in connection with FIG. 2C, the first input element may be associated with a configuration for the first data source.

Figure 1C:
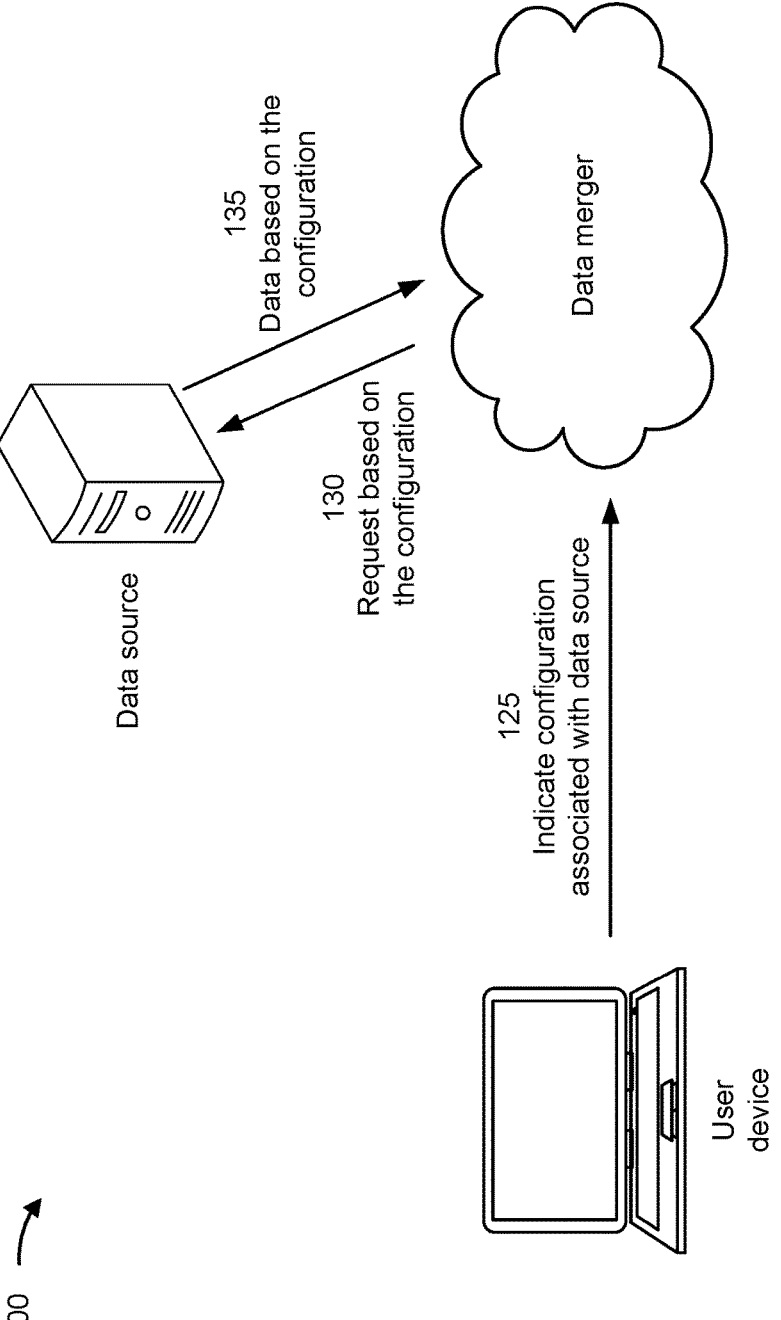

As shown in FIG. 1C and by reference number 125, the user device may transmit, and the data merger may receive, a configuration associated with the first data source. For example, the user may provide the configuration (e.g., using an input component) to the user device using the first input element, and the user device may transmit the configuration based on the user providing the configuration. In some implementations, the configuration associated with the first data source includes an Internet protocol (IP) address. For example, the IP address may indicate an API endpoint for the first data source (e.g., the first data source may be associated with a REST API). In some implementations, the configuration associated with the first data source includes an indication of a type of first data from the first data source. For example, the type of the first data may indicate data types of rows (and/or columns) for the first data (e.g., when the first data is tabular), data types of nodes and edges for the first data (e.g., when the first data is graphical), or data types separated by delimiters within the first data, among other examples. Additionally, in some implementations, the configuration may indicate a format for requesting the first data (e.g., which, if any, arguments to include in an API call to the first data source and/or which fields to include in a request body or a request header). In some implementations, as shown in FIG. 2C, the configuration may include a name (e.g., a human-readable name and/or a machine-readable name) for the first data source. In some implementations, the configuration may include a set of credentials associated with the first data source.

The data merger may connect to the first data source based on the configuration associated with the first data source. For example, as shown by reference number 130, the data merger may transmit, and the first data source may receive, a request based on the configuration. The request may be transmitted to an endpoint indicated in the configuration (e.g., to an IP address indicated in the configuration) and associated with the first data source. Additionally, the request may be in a request format indicated in the configuration. For example, the data merger may include arguments, if any, indicated in the configuration (e.g., for an API call) and/or fields, if any, indicated in the configuration (e.g., for a hypertext transfer protocol (HTTP) request or a file transfer protocol (FTP) request, among other examples). In some implementations, the request may include the set of credentials, associated with the first data source, such that the data merger is authorized to receive the first data.

As shown by reference number 135, the first data source may transmit, and the data merger may receive, the first data in response to the request. In some implementations, the first data may be included in a response that is in a response format indicated in the configuration associated with the first data source. For example, the first data may be included in fields indicated in the configuration and/or organized as indicated in the configuration (e.g., according to rows and columns, separated by delimiters, and/or according to nodes and edges, as indicated in the configuration, among other examples).

Because the data merger uses existing hardware and software resources to receive (and cache) the first data, the data merger conserves power and processing resources that otherwise would have been spent in establishing a new microservice to receive the first data. The ingesting of the first data, as described in connection with reference numbers 130 and 135, may be aperiodic. For example, the data merger may transmit the request in response to a request from a user (e.g., received at an output endpoint, as described in connection with FIG. 1E). Alternatively, the ingesting may be periodic. For example, the data merger may use the request to subscribe to periodic pushes from the first data source or may transmit the request according to a schedule to establish periodic pulls from the first data source. Alternatively, the first data source may stream the first data to the data merger.

Although the example 100 is described in connection with a single data source, other examples may include additional data sources. For example, the data merger may receive (from the user device) an indication that a second data source has been added to the canvas, may transmit (to the user device) instructions for a third pop-up window (e.g., to display a third pop-up window) that includes a third input element (e.g., at least one third input element), receive (from the user device) a configuration associated with the second data source using the third input element, and connect to the second data source based on the configuration associated with the second data source. Because the data merger has existing hardware and software resources to allocate to receive (and cache) second data from the second data source, the data merger is scalable in a way that conserves power and processing resources relative to establishing a new microservice to receive the second data.

Figure 1D:
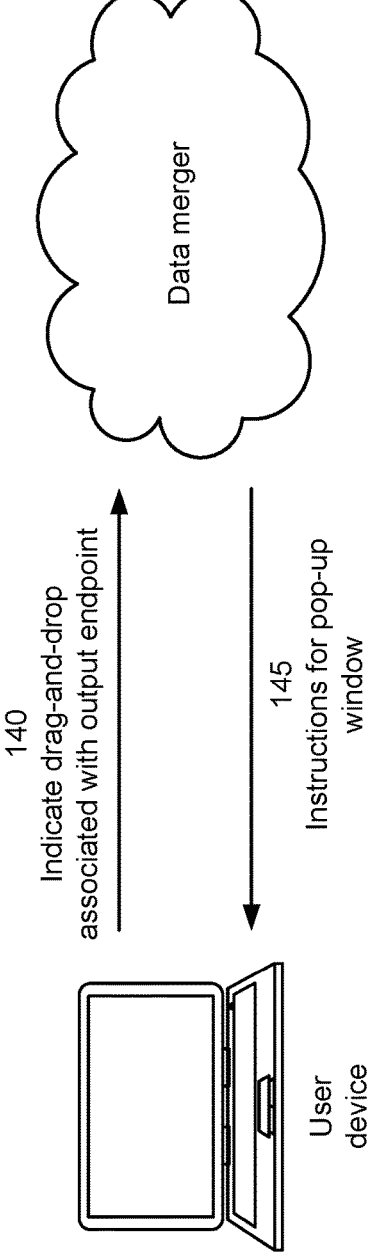

The user device may transmit, and the data merger may receive, an indication that a first output endpoint has been added to the canvas. For example, as shown in FIG. 1D and by reference number 140, the user device may transmit an indication of a drag-and-drop associated with the first output endpoint. As described in connection with FIG. 2D, the user (e.g., using an input component) may drag a second shape (associated with output endpoints) onto the canvas, which may cause the user device to transmit the indication associated with the first output endpoint.

In response to the indication, the data merger may transmit, and the user device may receive, instructions for a second pop-up window (e.g., to display a second pop-up window) associated with the first output endpoint that includes a second input element (e.g., at least one second input element), as shown by reference number 145. The user device may output the second pop-up window (e.g., using an output component) to the user for interaction. As described in connection with FIG. 2E, the second input element may be associated with a configuration for the first output endpoint.

In some implementations, the user device may additionally transmit, and the data merger may additionally receive, a command to connect the first data source to the first output endpoint. For example, as described in connection with FIG. 2F, the user (e.g., using an input component) may drag a third shape (associated with connectors) onto the canvas, which may cause the user device to transmit the command. The data merger may transmit the instructions for the second pop-up window in response to the command to connect the first data source to the first output endpoint.

Figure 1E:
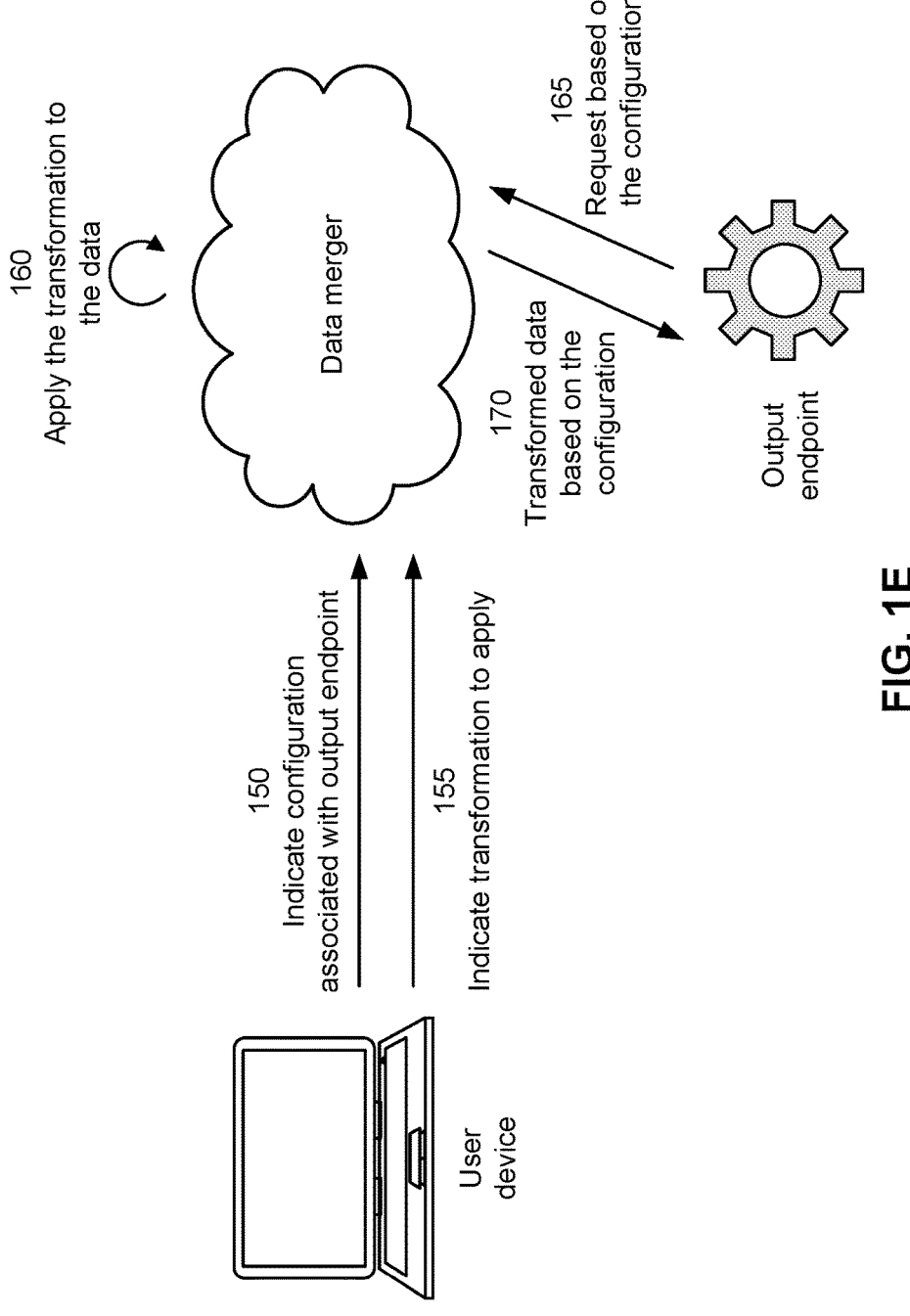

As shown in FIG. 1E and by reference number 150, the user device may transmit, and the data merger may receive, a configuration associated with the first output endpoint. For example, the user may provide the configuration (e.g., using an input component) to the user device using the second input element, and the user device may transmit the configuration based on the user providing the configuration. In some implementations, the configuration associated with the first output endpoint includes an IP address. For example, the IP address may indicate an API endpoint for the first output endpoint (e.g., the first output endpoint may be associated with a REST API). In some implementations, the configuration associated with the first output endpoint includes an indication of a request type associated with the first output endpoint. For example, the configuration may indicate which, if any, arguments to include in an API call to the first output endpoint and/or which fields to include in a request body or a request header. In some implementations, the configuration associated with the first output endpoint includes an indication of a response type associated with the first output endpoint. For example, the response type may indicate, for transformed data output by the first output endpoint, data types of rows and/or columns (e.g., when the transformed data is tabular), data types of nodes and edges (e.g., when the transformed data is graphical), or data types separated by delimiters (e.g., when the transformed data includes delimiter-separated values), among other examples. In some implementations, as shown in FIG. 2E, the configuration may include a name (e.g., a human-readable name and/or a machine-readable name) for the first output endpoint. In some implementations, the configuration may include a set of credentials associated with the first output endpoint.

As shown by reference number 155, the user device may transmit, and the data merger may receive, an indication of a first transformation to apply. The first transformation may apply to the first data, received from the first data source, to generate the transformed data output by the first output endpoint. For example, as described in connection with FIG. 2E, the user may provide the first transformation to the user device using an input component of the second pop-up window, and the user device may transmit the indication of the first transformation with the configuration associated with the first output endpoint. Alternatively, the user may use an input component of an additional pop-up window to provide the first transformation. For example, the data merger may transmit the instructions for the second pop-up window (associated with the first output endpoint) in response to the indication that the first output endpoint has been added to the canvas and may transmit instructions for the additional pop-up window (associated with the first transformation) in response to the indication that a connector has been added to the canvas. Accordingly, the user device may transmit the indication of the first transformation separately from the configuration associated with the first output endpoint. In some implementations, the additional pop-up window may additionally be associated with the first output endpoint such that the user device transmits a portion of the configuration, associated with the first output endpoint, with the indication of the first transformation. For example, the second pop-up window may include input elements associated with an IP address, a name, and/or a request type associated with the first output endpoint, and the additional pop-up window may include input elements associated with the first transformation and/or the response type associated with the first output endpoint.

Although the example 100 is described in connection with a single output endpoint, other examples may include additional output endpoints. For example, the data merger may receive (from the user device) an indication that a second output endpoint has been added to the canvas, may transmit (to the user device) instructions for a fourth pop-up window (e.g., to display a fourth pop-up window) that includes a fourth input element (e.g., at least one fourth input element), receive (from the user device) a configuration associated with the second output endpoint using the fourth input element, and receive an indication of a second transformation to apply to the first data received from the first data source. Because the data merger has existing hardware and software resources to allocate for transforming the first data and provisioning the second output endpoint, the data merger is scalable in a way that conserves power and processing resources relative to establishing a new microservice to provide differently transformed first data.

As shown by reference number 160, the data merger may apply the first transformation to the first data. For example, the data merger may generate transformed data by applying the first transformation to the first data. The first transformation may combine portions of the first data (e.g., combining values in different columns or rows or combining values associated with different nodes or edges), divide portions of the first data (e.g., splitting a column or a row into multiple values or splitting a node or an edge into multiple values), and/or apply a formula to portions of the first data (e.g., performing an arithmetic operation on values in a column or a row or on values associated with a node or an edge).

The data merger may output the transformed data, via the first output endpoint, based on the configuration associated with the first output endpoint. For example, as shown by reference number 165, the data merger may receive, at the first output endpoint, a request for the transformed data. The request may be in a request format indicated in the configuration. For example, the request may include arguments, if any, indicated in the configuration (e.g., for an API call) and/or fields, if any, indicated in the configuration (e.g., for an HTTP request or an FTP request, among other examples). In some implementations, the request may include the set of credentials, associated with the first output endpoint, such that a requesting device is authorized to receive the transformed data.

As shown by reference number 170, the data merger may transmit, via the first output endpoint, the transformed data in response to the request. In some implementations, the transformed data may be included in a response that is in a response format indicated in the configuration associated with the first output endpoint. For example, the transformed data may be included in fields indicated in the configuration and/or organized as indicated in the configuration (e.g., according to rows and columns, separated by delimiters, and/or according to nodes and edges, as indicated in the configuration, among other examples).

Because the data merger uses existing hardware and software resources to generate and output the transformed data, the data merger conserves power and processing resources that otherwise would have been spent in establishing a new microservice to generate and output the transformed data. The output of the transformed data, as described in connection with reference numbers 165 and 170, may be aperiodic. For example, the requesting device may transmit the request in response to input from a user. Alternatively, the output may be periodic. For example, the requesting device may use the request to subscribe to periodic pushes from the data merger or may transmit the request according to a schedule to establish periodic pulls from the data merger. Alternatively, the data merger may stream the transformed data via the first output endpoint.

Although the example 100 is described in connection with applying the first transformation to the first data, other examples may include the first transformation combining data from multiple data sources. For example, the data merger may connect to a second data source (e.g., as described above) and apply the first transformation to the first data from the first data source as well as second data from the second data source. Accordingly, the first transformation may combine the first data and the second data to generate the transformed data. Because the data merger has existing hardware and software resources to allocate for transforming the first data and provisioning the second output endpoint, the data merger is scalable in a way that conserves power and processing resources relative to establishing a new microservice to provide differently transformed first data.

FIGS. 1C and 1E depict a sequential process of receiving first data from the first data source, transforming the first data, and outputting the transformed data. However, other examples may include such processes in parallel. For example, the data merger may receive new data from the first data source while transforming and/or outputting data previously received from the first data source. Additionally, or alternatively, the data merger may receive data from multiple data sources in parallel and/or output data using multiple output endpoints in parallel.

Figure 1F:
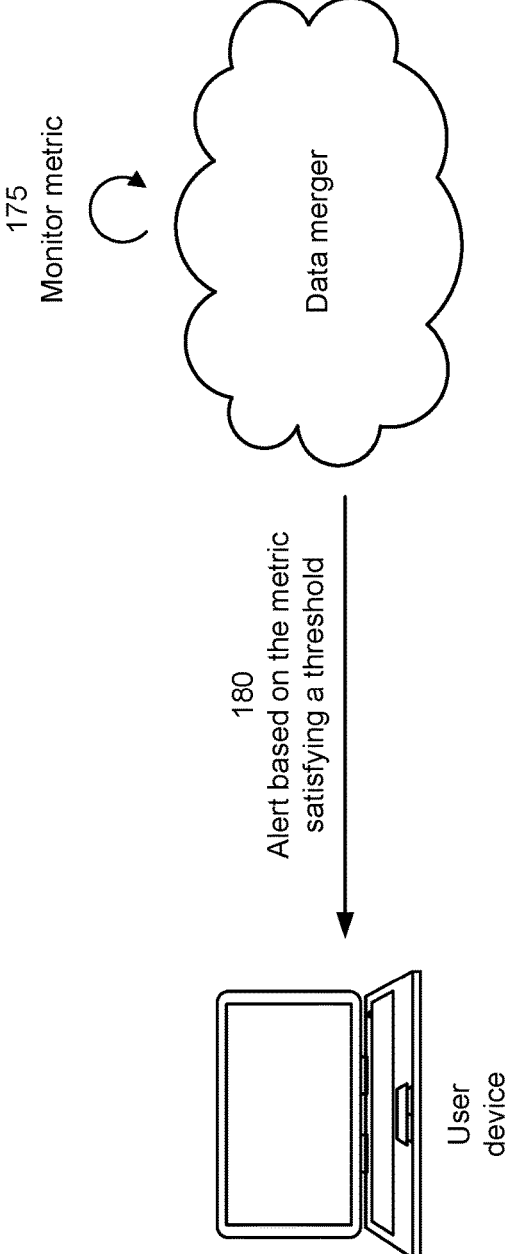

As shown in FIG. 1F and by reference number 175, the data merger may monitor a metric associated with flow of the first data from the first data source to the first output endpoint. For example, the metric may include an average packet size from the first data source, an average download speed from the first data source, an average quantity of processor cycles for generating the transformed data, and/or a processing time associated with each transmission of the transformed data, among other examples.

As shown by reference number 180, the data merger may transmit, and the user device may receive, an alert based on the metric satisfying an alert threshold. The alert threshold may be a default value (e.g., stored in a memory controlled by, or at least associated with, the data merger) or may be indicated by the user device or by an administrator device (e.g., a user device associated with an administrator who is separate from the user that established the flow). Although the example 100 is described in connection with the alert being transmitted to the user device, other examples may include the alert being transmitted to the administrator device. Therefore, the user and/or the administrator may be aware of abnormal traffic patterns through the data merger, which helps prevent damage to the data merger that would cause outages and cost power and processing resources to resolve.

Additionally, or alternatively, the data merger may refrain from receiving the first data, applying the first transformation, and/or outputting the transformed data based on the metric satisfying a cessation threshold. The cessation threshold may be a default value or may be indicated by the user device or by an administrator device. Therefore, the data merger may automatically prevent damage to the data merger, from abnormal traffic patterns, that would cause outages and cost power and processing resources to resolve.

Although the example 100 is described in connection with a single flow of data, other examples may include additional flows. For example, the data merger may monitor a metric associated with flow of second data from a second data source to the first output endpoint and/or a metric associated with flow of the first data from the first data source to a second output endpoint, among other examples. Because the data merger has existing hardware and software resources to allocate for monitoring, the data merger is scalable in a way that conserves power and processing resources relative to establishing new microservices to monitor additional metrics.

Figure 1G:
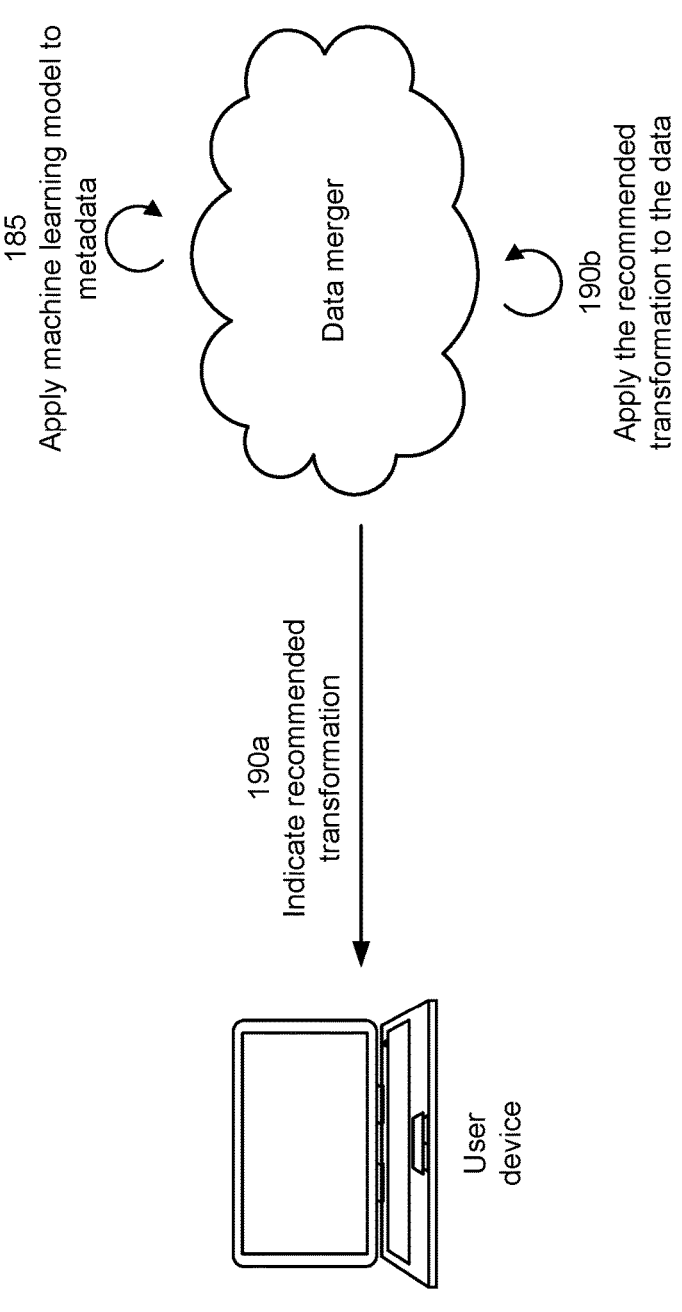

As shown in FIG. 1G and by reference number 185, the data merger may apply a machine learning model to the first data received from the first data source (and/or to metadata associated with the first data). In some implementations, the data merger may apply the machine learning model based on a setting indicated in the configuration associated with the first output endpoint. For example, as shown in FIG. 2E, the setting may be indicated using an element of the second pop-up window.

The machine learning model may generate a recommended transformation for the first data. For example, the data merger may provide (e.g., as input) the first data (and/or the metadata associated with the first data) to the machine learning model and may receive (e.g., as output) an indication of a second transformation recommended by the machine learning model.

In some implementations, the model may include a regression algorithm (e.g., linear regression or logistic regression), which may include a regularized regression algorithm (e.g., Lasso regression, Ridge regression, or Elastic-Net regression). Additionally, or alternatively, the model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the historical cloud computing task information). For example, for a regression algorithm, a model parameter may include a regression coefficient (e.g., a weight). For a decision tree algorithm, a model parameter may include a decision tree split location, as an example.

Additionally, the data merger may use one or more hyperparameter sets to tune the model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm. In some implementations, the model may be a clustering model that groups similar portions of the first data together. Accordingly, the data merger may generate the recommended transformation based on portions of the first data that are classified in a same cluster.

Although the example 100 is described in connection with a recommended transformation to the first data, other examples may include a recommended transformation to data from multiple data sources. For example, the machine learning model may output a recommended transformation to apply to the first data and second data from a second data source. Because the data merger has existing hardware and software resources to allocate for the machine learning model, the data merger is scalable in a way that conserves power and processing resources relative to applying the machine learning model to data from additional data sources (and/or metadata associated with data from additional data sources).

As shown by reference number 190*a*, the data merger may transmit, and the user device may receive, an indication of the recommended transformation from the machine learning model. For example, as shown in FIG. 2G, the recommended transformation may be indicated in an additional pop-up window. Alternatively, the recommended transformation may be indicated in an email message, a text message, and/or a push notification, among other examples. Although the example 100 is described in connection with the indication being transmitted to the user device, other examples may include the indication being transmitted to the administrator device.

Additionally, or alternatively, as shown by reference number 190*b*, the data merger may apply the recommended transformation to the first data. For example, the data merger may reconfigure the first output endpoint to output transformed data based on application of the recommended transformation. The data merger may apply the recommended transformation automatically. Alternatively, the user device may transmit, and the data merger may receive, an acceptance of the recommended transformation. For example, as described in connection with FIG. 2G, the user may interact with a button (or another element) of a pop-up window to trigger the user device to transmit the acceptance. Accordingly, the data merger may apply the recommended transformation in response to the acceptance. Although the example 100 is described in connection with the user device transmitting the acceptance, other examples may include the administrator device transmitting the acceptance.

By using techniques as described in connection with FIGS. 1A-1G, the data merger may connect to the data source and provision the output endpoint using existing hardware and software resources. As a result, power and processing resources are conserved that otherwise would have been consumed in constructing new microservices to receive the first data and output the transformed data. Additionally, the data merger may apply the machine learning model to generate a recommended transformation for the first data. As a result, the data merger may increase accuracy and usefulness of the transformed data using the recommended transformation, which conserves power and processing resources that would otherwise have been wasted on cleaning the transformed data.

As indicated above, FIGS. 1A-1G are provided as an example. Other examples may differ from what is described with regard to FIGS. 1A-1G.

FIGS. 2A-2G are diagrams of a series 200 of example UIs associated with visual data merge pipelines. The example UIs shown in FIGS. 2A-2G may be output by a user device based on instructions from a data merger. These devices are described in more detail in connection with FIGS. 3 and 4.

Figure 2A:
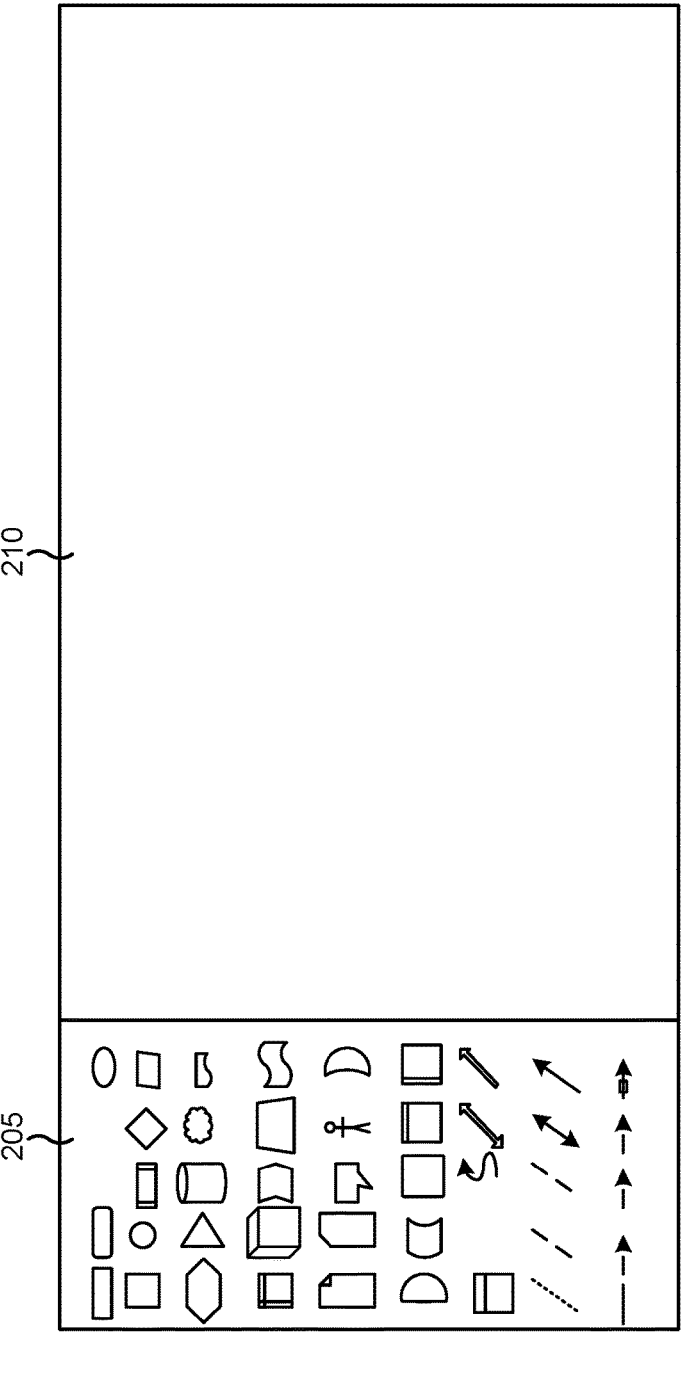
FIGS. 2A-2G are diagrams of example user interfaces relating to visual data merge pipelines, in accordance with some embodiments of the present disclosure.

As shown in FIG. 2A, an example UI may depict a toolbox 205 with a plurality of shapes and a canvas 210 for data sources and output endpoints. The toolbox 205 may include first shapes associated with data sources and second shapes associated with output endpoints. In some implementations, the toolbox 205 may further include third shapes associated with connectors.

Figure 2B:
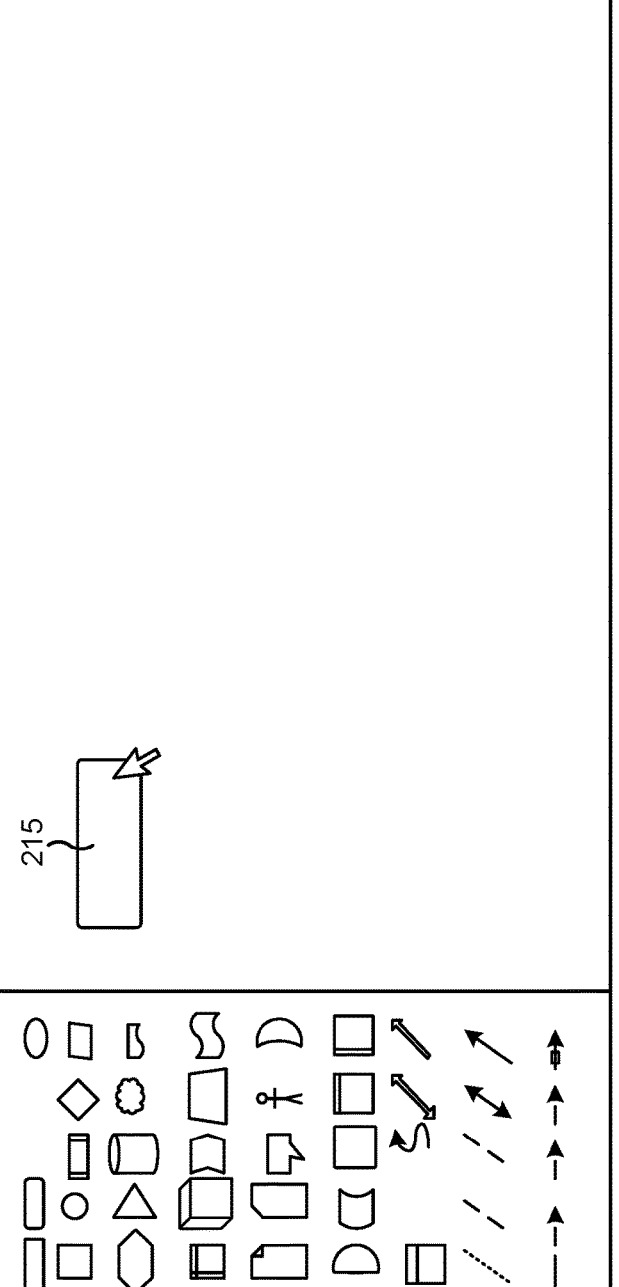
Figure 2C:
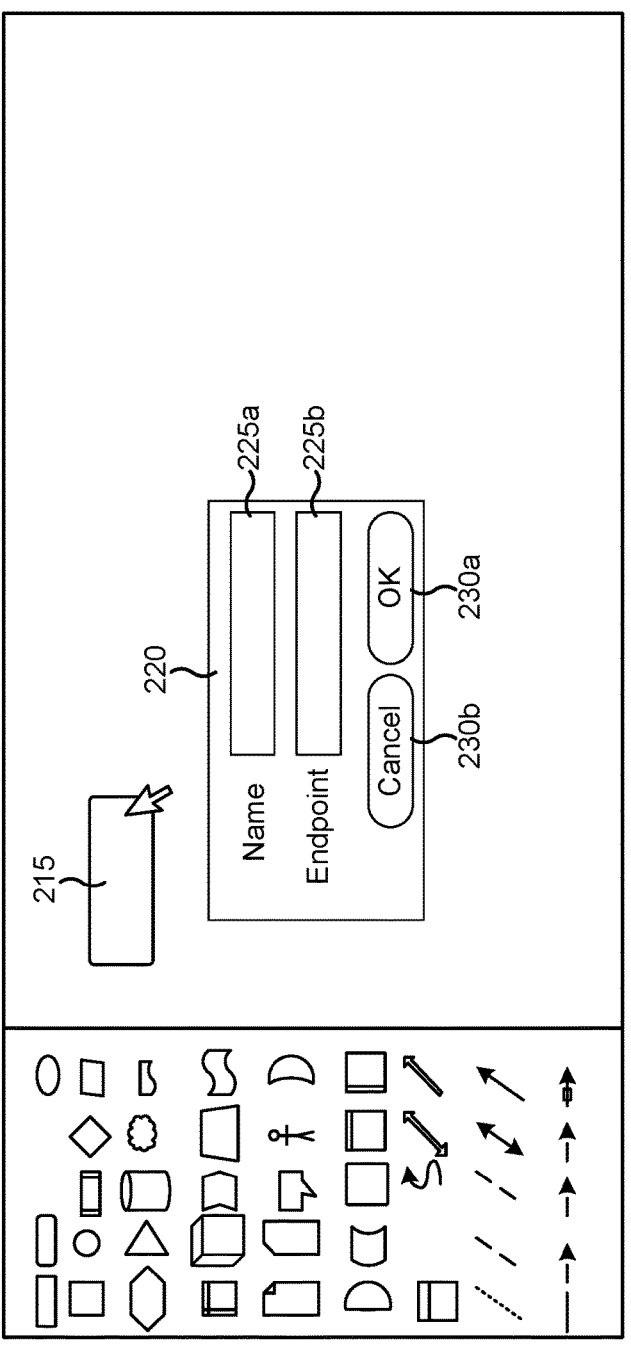

As shown in FIG. 2B, a user may perform a drag-and-drop (e.g., using a mouse, a touchscreen, or a microphone) to move a first shape 215 from the toolbox 205 onto the canvas 210. In FIG. 2B, the user is still "dragging" the first shape 215 from the toolbox 205 and has not yet "dropped" the first shape 215 onto the canvas 210.

As shown in FIG. 2C, a pop-up window 220 is shown. The pop-up window 220 may be generated in response to the user "dropping" the first shape 215 onto the canvas 210. The pop-up window 220 may include input elements associated with a configuration for a data source associated with the first shape 215, such as text box 225a associated with a name for the data source and text box 225b associated with an endpoint for the data source. Additional input elements may be associated with different portions of the configuration. The pop-up window 220 may further include a button 230a that triggers transmission of the configuration to the data merger and a button 230b that triggers removal of the first shape 215 from the canvas 210.

Figure 2D:
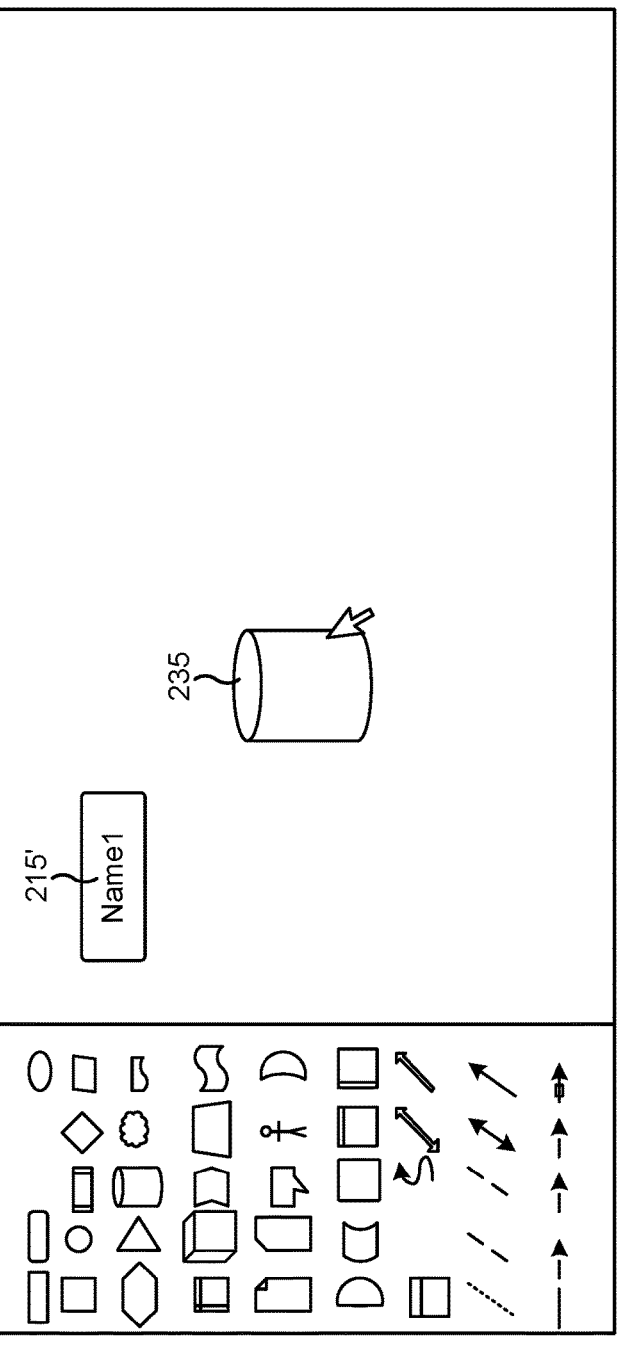
Figure 2E:
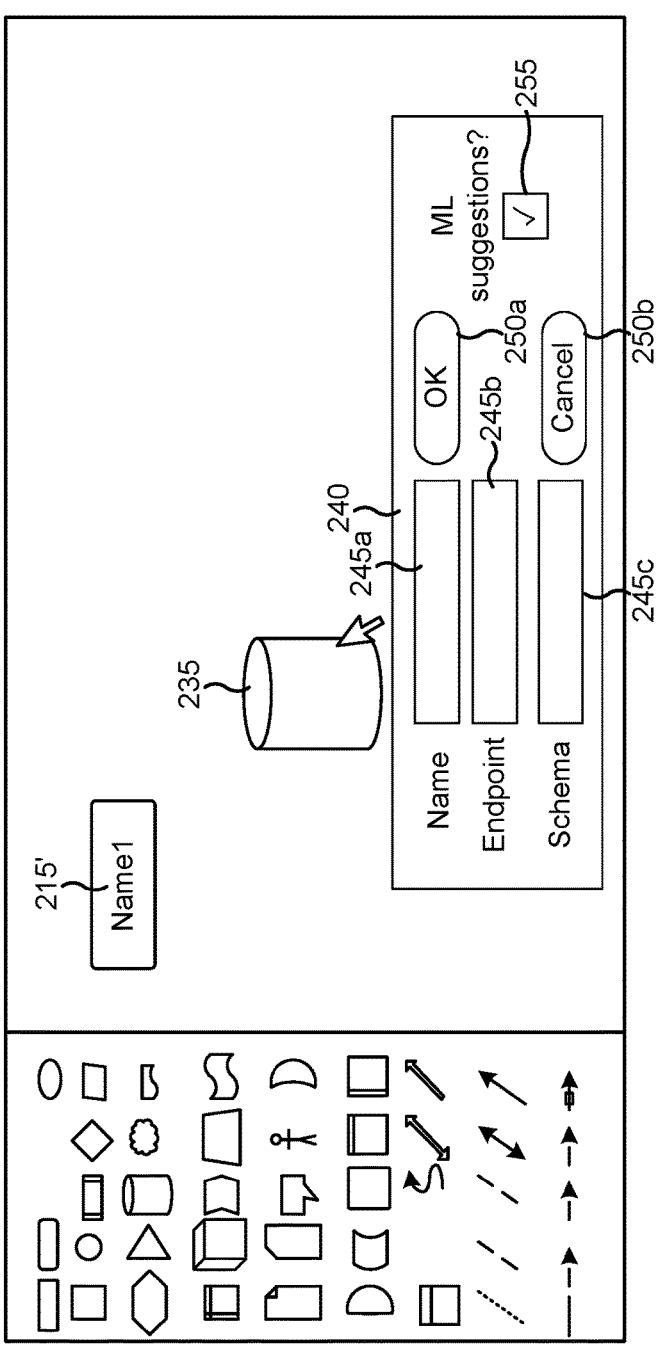

As shown in FIG. 2D, after transmission of the configuration to the data merger, the first shape 215 is modified to become first shape 215', which includes the name for the data source (e.g., as indicated using the text box 225a). As further shown in FIG. 2D, a user may perform a drag-and-drop (e.g., using a mouse, a touchscreen, or a microphone) to move a second shape 235 from the toolbox 205 onto the canvas 210. In FIG. 2D, the user is still "dragging" the second shape 235 from the toolbox 205 and has not yet "dropped" the second shape 235 onto the canvas 210.

As shown in FIG. 2E, a pop-up window 240 is shown. The pop-up window 240 may be generated in response to the user "dropping" the second shape 235 onto the canvas 210. The pop-up window 240 may include input elements associated with a configuration for an output endpoint associated with the second shape 235, such as text box 245a associated with a name for the output endpoint, text box 245b associated with an endpoint for the output endpoint, and text box 245c associated with a schema for the output endpoint (also referred to as a "transformation" to apply to data from data sources connected to the output endpoint). Additional input elements may be associated with different portions of the configuration. The pop-up window 240 may further include a button 250a that triggers transmission of the configuration to the data merger and a button 250b that triggers removal of the second shape 235 from the canvas 210. In some implementations, the pop-up window 240 may further include an input element associated with applying a machine learning model to metadata associated with the output endpoint, such as checkbox 255. Accordingly, the checkbox 255 may be used to indicate whether the data merger is permitted to apply the machine learning model to metadata associated with the output endpoint.

Figure 2F:
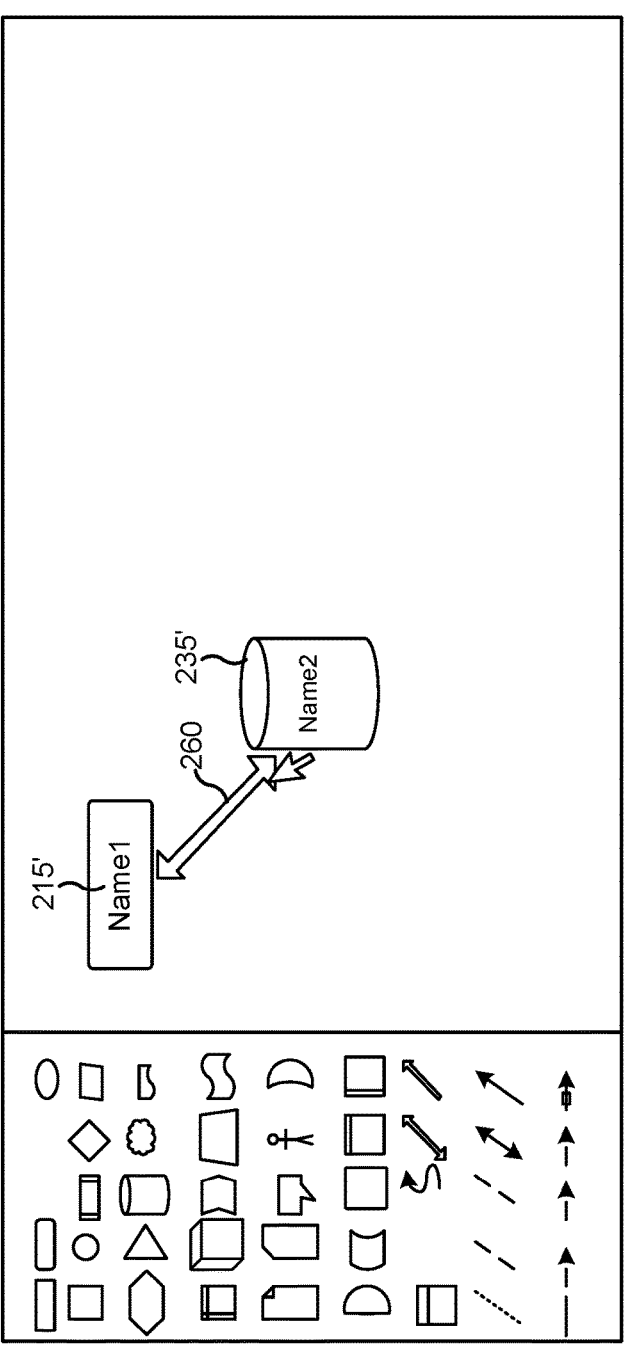
Figure 2G:
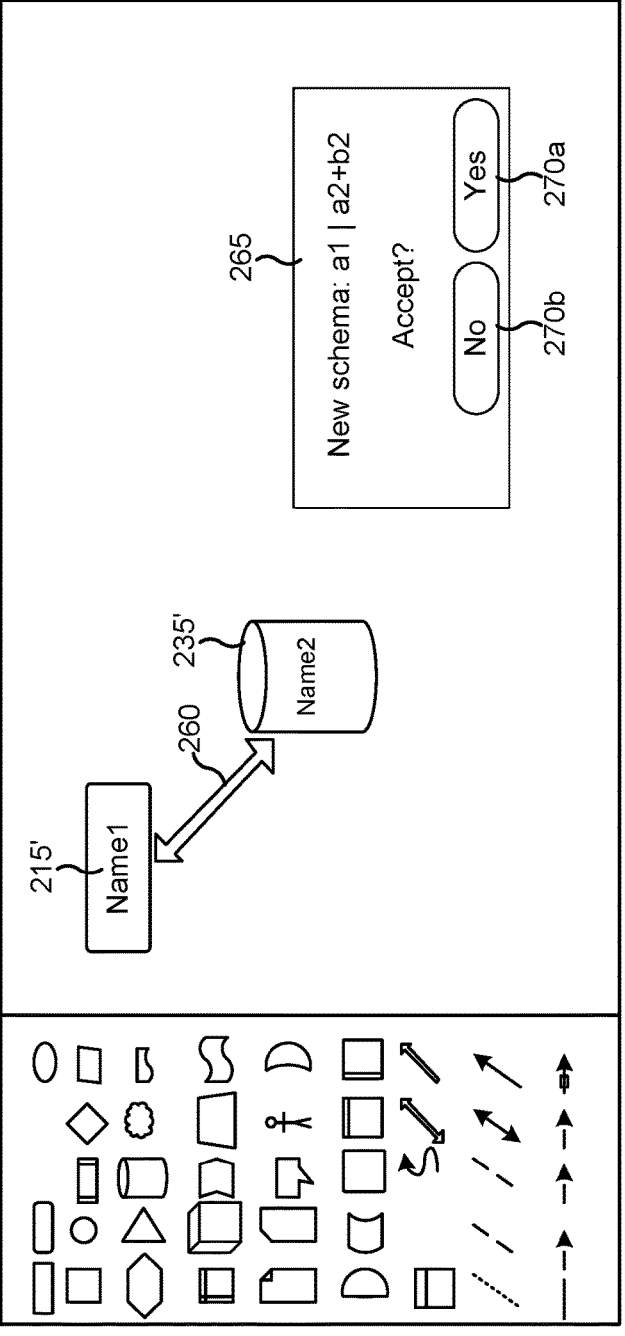

As shown in FIG. 2F, after transmission of the configuration to the data merger, the second shape 235 is modified to become second shape 235', which includes the name for the output endpoint (e.g., as indicated using the text box 245a). As further shown in FIG. 2F, a user may perform a drag-and-drop (e.g., using a mouse, a touchscreen, or a microphone) to move a third shape 260 from the toolbox 205 onto the canvas 210. The third shape 260 may connect the data source represented by the first shape 215' to the output endpoint represented by the second shape 235'. Other examples may not include the third shape 260 and automatically connect the data source to the output endpoint.

In some implementations, an additional pop-up window may be generated in response to the user "dropping" the third shape 260 onto the canvas 210. For example, the additional pop-up window may include input elements associated with portions of the configuration associated with the output endpoint and/or input elements associated with the transformation to apply to data from the data source.

After the data merger applies the machine learning model, the data merger may transmit instructions for a pop-up window 265 (e.g., to display the pop-up window 265) as shown in FIG. 2G. The pop-up window 265 indicates a recommended transformation, output by the machine learning model, to replace the transformation indicated using the pop-up window 240. The pop-up window 265 may further include a button 270a that triggers acceptance of the recommended transformation and a button 270b that triggers denial of the recommended transformation.

By using techniques as described in connection with FIGS. 2A-2G, the user may drag shapes onto UIs to construct a data pipeline that transforms data from multiple data sources and maintains an output endpoint for providing the transformed data. As a result, power and processing resources are conserved that otherwise would have been consumed in constructing new microservices to ingest the data from multiple data sources, transform the data, and output the transformed data.

As indicated above, FIGS. 2A-2G are provided as examples. Other examples may differ from what is described with regard to FIGS. 2A-2G.

Figure 3:
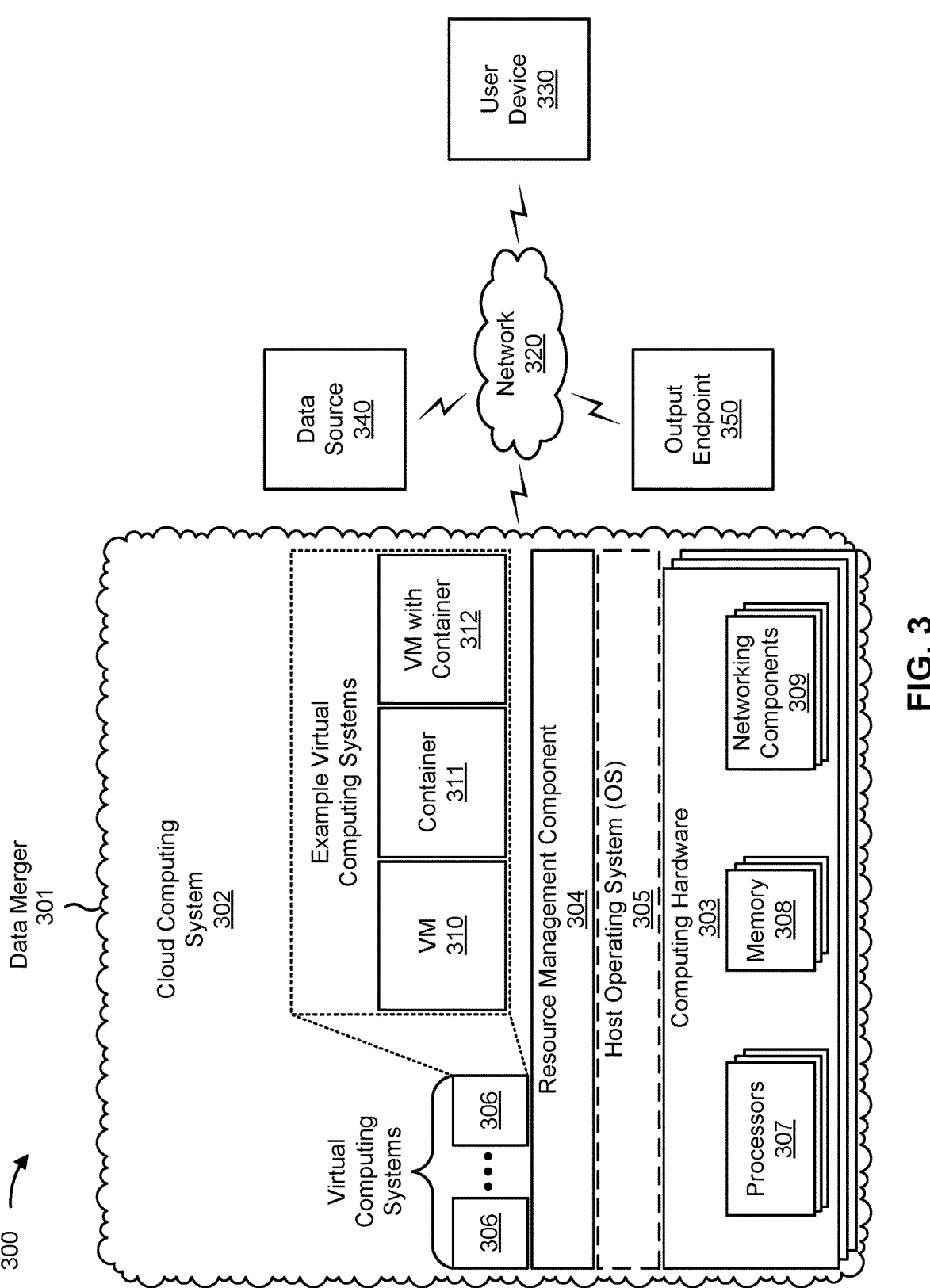
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a data merger 301, which may include one or more elements of and/or may execute within a cloud computing system 302. The cloud computing system 302 may include one or more elements 303-312, as described in more detail below. As further shown in FIG. 3, environment 300 may include a network 320, a user device 330, a data source 340, and/or an output endpoint 350. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the data merger 301 may include one or more elements 303-312 of the cloud computing system 302, may execute within the cloud computing system 302, and/or may be hosted within the cloud computing system 302, in some implementations, the data merger 301 may not be cloud-based (e.g., may be implemented outside of a cloud computing system) or may be partially cloud-based. For example, the data merger 301 may include one or more devices that are not part of the cloud computing system 302, such as device 400 of FIG. 4, which may include a stand-alone server or another type of computing device. The data merger 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information associated with data sources and output endpoints, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 330 may communicate with one or more other devices of environment 300, as described elsewhere herein.

The data source 340 may include one or more devices capable of receiving, generating, storing, processing, and/or providing data, as described elsewhere herein. The data source 340 may include a communication device and/or a computing device. For example, the data source 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 340 may communicate with one or more other devices of environment 300, as described elsewhere herein.

The output endpoint 350 may be implemented with one or more devices capable of receiving, processing, storing, routing, and/or providing transformed data (e.g., a packet and/or other information or metadata) in a manner described herein. For example, the output endpoint 350 may be implemented with a router, such as a label switching router (LSR), a label edge router (LER), an ingress router, an egress router, a provider router (e.g., a provider edge router or a provider core router), a virtual router, or another type of router. Additionally, or alternatively, the output endpoint 350 may be implemented with a gateway, a switch, a firewall, a hub, a bridge, a reverse proxy, a server (e.g., a proxy server, a cloud server, or a data center server), a load balancer, and/or a similar device. In some implementations, the output endpoint 350 may be implemented with a physical device within a housing, such as a chassis. In some implementations, the output endpoint 350 may be implemented using a virtual device implemented by one or more computing devices of a cloud computing environment or a data center. One or more other devices of environment 300 may communicate with the output endpoint 350, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
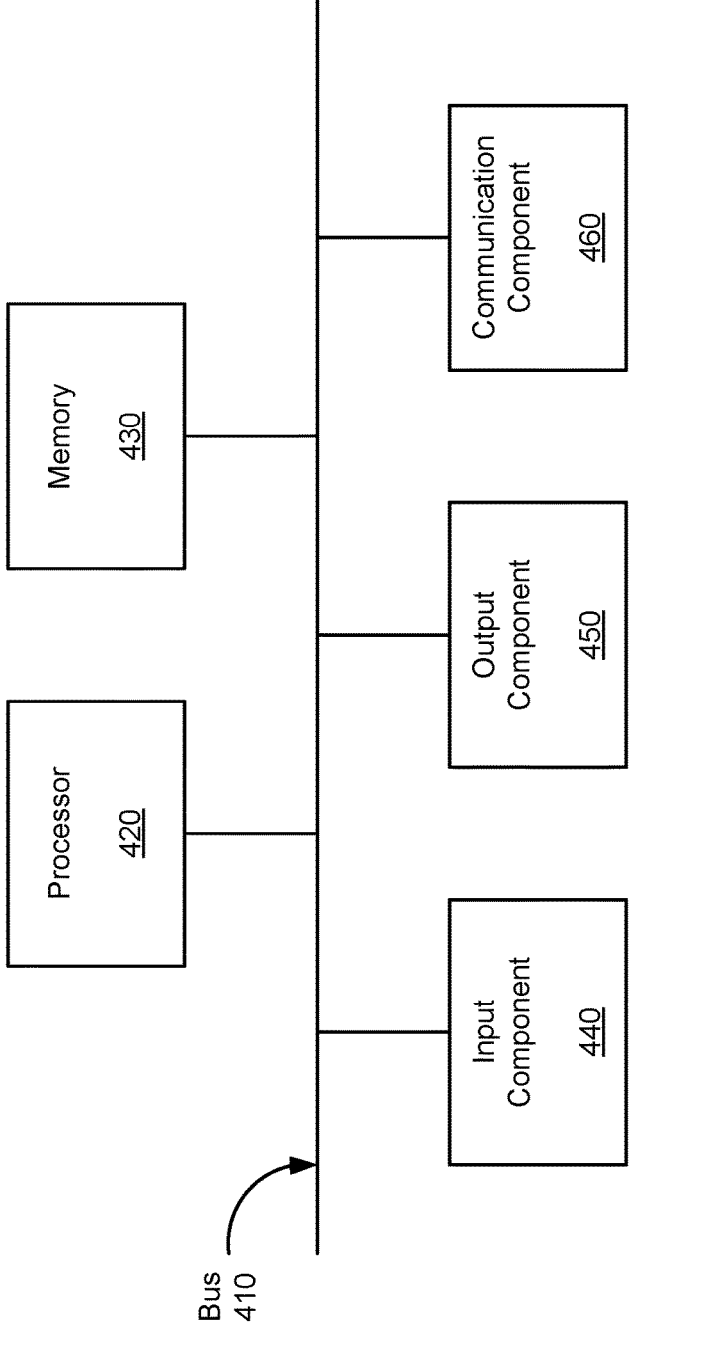
FIG. 4 is a diagram of example components of one or more devices of FIG. 3, in accordance with some embodiments of the present disclosure.

FIG. 4 is a diagram of example components of a device 400 associated with visual data merge pipelines. The device 400 may correspond to a user device 330, a data source 340, and/or a device implementing an output endpoint 350. In some implementations, the user device 330, the data source 340, and/or the device implementing the output endpoint 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with visual data merge pipelines. In some implementations, one or more process blocks of FIG. 5 may be performed by the data merger 301. In some implementations, one or more process blocks of FIG. 5 may be performed by another device or a group of devices separate from or including the data merger 301, such as the user device 330, the data source 340, and/or a device implementing the output endpoint 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include transmitting instructions to display a UI that visually depicts a canvas for data sources and output endpoints (block 505). For example, the data merger 301 (e.g., using processor 420, memory 430, and/or communication component 460) may transmit instructions to display a UI that visually depicts a canvas for data sources and output endpoints, as described above in connection with reference number 110 of FIG. 1A. As an example, the data merger 301 may verify a set of credentials is associated with an account that is authorized to access the data merger 301 and may transmit the instructions for the UI in response to verifying the set of credentials. The UI may be as described in connection with FIG. 2A.

As further shown in FIG. 5, process 500 may include receiving an indication that a first data source has been added to the canvas (block 510). For example, the data merger 301 (e.g., using processor 420, memory 430, input component 440, and/or communication component 460) may receive an indication that a first data source has been added to the canvas, as described above in connection with reference number 115 of FIG. 1B. As an example, the data merger 301 may receive an indication of a drag-and-drop associated with the first data source. As described in connection with FIG. 2B, a user may drag a first shape (associated with data sources) onto the canvas, which may cause a user device to transmit the indication associated with the first data source.

As further shown in FIG. 5, process 500 may include transmitting instructions to display a first pop-up window that includes at least one first input element (block 515). For example, the data merger 301 (e.g., using processor 420, memory 430, and/or communication component 460) may transmit instructions to display a first pop-up window that includes at least one first input element, as described above in connection with reference number 120 of FIG. 1B. As an example, the data merger 301 may transmit the instructions for the first pop-up window in response to the indication that the first data source has been added to the canvas. As described in connection with FIG. 2C, the at least one first input element may be associated with a configuration for the first data source.

As further shown in FIG. 5, process 500 may include receiving a configuration, associated with the first data source, using the at least one first input element (block 520). For example, the data merger 301 (e.g., using processor 420, memory 430, input component 440, and/or communication component 460) may receive a configuration, associated with the first data source, using the at least one first input element, as described above in connection with reference number 125 of FIG. 1C. As an example, a user may provide the configuration to a user device using the at least one first input element, and the user device may transmit the configuration to the data merger 301 based on the user providing the configuration.

As further shown in FIG. 5, process 500 may include receiving an indication that a first output endpoint has been added to the canvas (block 525). For example, the data merger 301 (e.g., using processor 420, memory 430, input component 440, and/or communication component 460) may receive an indication that a first output endpoint has been added to the canvas, as described above in connection with reference number 140 of FIG. 1D. As an example, the data merger 301 may receive an indication of a drag-and-drop associated with the first output endpoint. As described in connection with FIG. 2D, a user may drag a second shape (associated with output endpoints) onto the canvas, which may cause a user device to transmit the indication associated with the first output endpoint.

As further shown in FIG. 5, process 500 may include transmitting instructions to display a second pop-up window that includes at least one second input element (block 530). For example, the data merger 301 (e.g., using processor 420, memory 430, and/or communication component 460) may transmit instructions to display a second pop-up window that includes at least one second input element, as described above in connection with reference number 145 of FIG. 1D. As an example, the data merger 301 may transmit the instructions for the second pop-up window in response to the indication that the first output endpoint has been added to the canvas. As described in connection with FIG. 2E, the at least one second input element may be associated with a configuration for the first output endpoint.

As further shown in FIG. 5, process 500 may include receiving a configuration associated with the first output endpoint using the at least one second input element (block 535). For example, the data merger 301 (e.g., using processor 420, memory 430, input component 440, and/or communication component 460) may receive a configuration associated with the first output endpoint using the at least one second input element, as described above in connection with reference number 150 of FIG. 1E. As an example, a user may provide the configuration to a user device using the at least one second input element, and the user device may transmit the configuration to the data merger 301 based on the user providing the configuration.

As further shown in FIG. 5, process 500 may include receiving an indication of a first transformation to apply to first data received from the first data source, where the first output endpoint transmits the first data after application of the first transformation (block 540). For example, the data merger 301 (e.g., using processor 420, memory 430, input component 440, and/or communication component 460) may receive an indication of a first transformation to apply to first data received from the first data source, where the first output endpoint transmits the first data after application of the first transformation, as described above in connection with reference number 155 of FIG. 1E. As an example, a user may indicate the first transformation to a user device using a pop-up window (e.g., as described in connection with FIG. 2E), and the user device may transmit the indication of the first transformation to the data merger 301 based on the user indicating the first transformation.

As further shown in FIG. 5, process 500 may include providing the first data, received from the first data source, to a machine learning model and receiving an indication of a second transformation recommended by the machine learning model (block 545). For example, the data merger 301 (e.g., using processor 420 and/or memory 430) may provide the first data, received from the first data source, to a machine learning model and may receive an indication of a second transformation recommended by the machine learning model, as described above in connection with reference number 185 of FIG. 1G. As an example, the data merger 301 may provide the first data to the machine learning model based on a setting indicated in the configuration associated with the first output endpoint (e.g., indicated using an element of the second pop-up window, as shown in FIG. 2E), and the data merger 301 may receive may receive, as output from the machine learning model, an indication of a recommended transformation to use.

As further shown in FIG. 5, process 500 may include transmitting the indication of the second transformation (block 550). For example, the data merger 301 (e.g., using processor 420, memory 430, and/or communication component 460) may transmit the indication of the second transformation, as described above in connection with reference number 190a of FIG. 1G. As an example and as shown in FIG. 2G, the second transformation may be indicated in an additional pop-up window. Alternatively, the second transformation may be indicated in an email message, a text message, and/or a push notification, among other examples.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1G and/or 2A-2F. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for visually building data merge pipelines, the system comprising:
   one or more memories; and
   one or more processors, communicatively coupled to the one or more memories, configured to:
      transmit instructions to display a user interface that visually depicts a canvas for data sources and output endpoints;
      receive an indication that a first data source has been added to the canvas;
      transmit instructions to display a first pop-up window that includes at least one first input element;
      receive a configuration, associated with the first data source, using the at least one first input element;
      receive an indication that a first output endpoint has been added to the canvas;
      transmit instructions to display a second pop-up window that includes at least one second input element;
      receive a configuration associated with the first output endpoint using the at least one second input element;
      receive an indication of a first transformation to apply to first data received from the first data source, wherein the first output endpoint transmits the first data after application of the first transformation;
      provide the first data, received from the first data source, to a machine learning model and receive an indication of a second transformation recommended by the machine learning model; and
      transmit the indication of the second transformation.

2. The system of claim 1, wherein the first data source is associated with a first shape on the canvas, and the first output endpoint is associated with a second shape on the canvas.

3. The system of claim 1, wherein the one or more processors are configured to:
   receive a command to connect the first data source to the first output endpoint,
      wherein the instructions for the second pop-up window are transmitted in response to the command.

4. The system of claim 1, wherein the one or more processors are configured to:
   receive an indication that a second data source has been added to the canvas;
   transmit instructions to display a third pop-up window that includes at least one third input element; and
   receive a configuration associated with the second data source using the at least one third input element,
      wherein the first transformation applies to the first data received from the first data source and second data received from the second data source.

5. The system of claim 1, wherein the one or more processors are configured to:
   receive an indication that a second output endpoint has been added to the canvas;
   transmit instructions to display a third pop-up window that includes at least one third input element;
   receive a configuration associated with the second output endpoint using the at least one third input element; and
   receive an indication of a third transformation to apply to the first data received from the first data source, wherein the second output endpoint transmits the first data after application of the third transformation, wherein the machine learning model recommends a fourth transformation based on the first data received from the first data source.

6. The system of claim 1,
wherein the one or more processors are configured to:
receive the first data from the first data source based on the configuration associated with the first data source; and
output transformed data, based on applying the first transformation to the first data, via the first output endpoint based on the configuration associated with the first output endpoint.

7. A method of using machine learning for common schemas, comprising:
receiving a configuration associated with a first data source, wherein the configuration includes an Internet protocol (IP) address and an indication of a type of first data received from the first data source;
receiving a configuration associated with a second data source;
receiving a configuration associated with a first output endpoint;
receiving an indication of a first transformation to apply to the first data and to second data received from the second data source, wherein the first output endpoint transmits a combination of the first data and the second data after application of the first transformation;
providing metadata, associated with the first data and the second data, to a machine learning model and receiving an indication of a second transformation recommended by the machine learning model; and
transmitting the indication of the second transformation.

8. The method of claim 7, further comprising:
receiving an acceptance of the second transformation recommended by the machine learning model; and
reconfiguring the first output endpoint to transmit a combination of the first data and the second data after application of the second transformation.

9. The method of claim 7,
wherein the first data source is associated with a representational state transfer application programming interface.

10. The method of claim 7,
wherein the first output endpoint is associated with a representational state transfer application programming interface.

11. The method of claim 7, further comprising:
monitoring a metric associated with flow of the first data from the first data source to the first output endpoint; and
transmitting an alert based on the metric satisfying a threshold.

12. The method of claim 11, further comprising:
receiving an indication of the threshold from a user device.

13. The method of claim 7,
wherein the IP address indicates an application programming interface endpoint for the first data source.

14. The method of claim 7,
wherein the configuration associated with the first output endpoint includes an Internet protocol address, an indication of a request type associated with the first output endpoint, and an indication of a response type associated with the first output endpoint.

15. A non-transitory computer-readable medium storing a set of instructions for visually building data merge pipelines, the set of instructions comprising:

one or more instructions that, when executed by one or more processors of a device, cause the device to:
transmit instructions for a user interface that visually depicts a canvas for data sources and output endpoints;
receive an indication that a first data source has been added to the canvas;
transmit instructions for a first pop-up window that includes at least one first input element;
receive a configuration associated with the first data source using the at least one first input element;
connect to the first data source based on the configuration associated with the first data source;
receive an indication that a first output endpoint has been added to the canvas;
transmit instructions for a second pop-up window that includes at least one second input element;
receive a configuration, associated with the first output endpoint, using the at least one second input element;
receive an indication of a first transformation to apply to first data received from the first data source; and
transmit transformed data, based on applying the first transformation to the first data, via the first output endpoint based on the configuration associated with the first output endpoint.

16. The non-transitory computer-readable medium of claim 15,
wherein the one or more instructions, that cause the device to transmit the transformed data, cause the device to:
receive a request at the first output endpoint for the transformed data, wherein the request is in a request format indicated in the configuration associated with the first output endpoint; and
transmit the transformed data in response to the request.

17. The non-transitory computer-readable medium of claim 16,
wherein the transformed data is transmitted in a response that is in a response format indicated in the configuration associated with the first output endpoint.

18. The non-transitory computer-readable medium of claim 15,
wherein the one or more instructions, that cause the device to connect to the first data source, cause the device to:
transmit a request to an endpoint, indicated in the configuration associated with the first data source, for the first data, wherein the request is in a request format indicated in the configuration associated with the first data source; and
receive the first data in response to the request.

19. The non-transitory computer-readable medium of claim 18,
wherein the first data is received in a response that is in a response format indicated in the configuration associated with the first data source.

20. The non-transitory computer-readable medium of claim 18,
wherein the request includes a set of credentials included in the configuration associated with the first data source.

* * * * *